United States Patent
Watson et al.

(10) Patent No.: US 12,416,768 B2
(45) Date of Patent: Sep. 16, 2025

(54) SYSTEM FOR FIBER CONNECTOR ASSEMBLY

(71) Applicant: Ortronics, Inc., New London, CT (US)

(72) Inventors: Matthew Cameron Watson, Morganton, NC (US); Brandon Deal, Hickory, NC (US)

(73) Assignee: Legrand DPC, LLC, West Hartford, CT (US)

( * ) Notice: Subject to any disclaimer, the term of this patent is extended or adjusted under 35 U.S.C. 154(b) by 143 days.

(21) Appl. No.: 18/134,740

(22) Filed: Apr. 14, 2023

(65) Prior Publication Data

US 2023/0333328 A1    Oct. 19, 2023

Related U.S. Application Data

(60) Provisional application No. 63/331,995, filed on Apr. 18, 2022.

(51) Int. Cl.
*G02B 6/38* (2006.01)

(52) U.S. Cl.
CPC ........... *G02B 6/387* (2013.01); *G02B 6/3825* (2013.01); *G02B 6/3874* (2013.01)

(58) Field of Classification Search
CPC ........................................................ G02B 6/38
USPC .......................................................... 385/78
See application file for complete search history.

(56) References Cited

U.S. PATENT DOCUMENTS

| | | | | |
|---|---|---|---|---|
| 4,762,389 A | * | 8/1988 | Kaihara | G02B 6/3825 385/59 |
| 4,960,317 A | * | 10/1990 | Briggs | G02B 6/475 385/56 |
| 5,883,995 A | * | 3/1999 | Lu | G02B 6/3825 385/75 |
| 6,142,676 A | * | 11/2000 | Lu | G02B 6/3807 385/139 |
| 6,188,825 B1 | * | 2/2001 | Bandy | G02B 6/3825 359/511 |
| 6,926,449 B1 | * | 8/2005 | Keenum | G02B 6/3897 385/136 |
| 11,249,267 B2 | * | 2/2022 | Van Baelen | G02B 6/4439 |
| 2005/0254757 A1 | * | 11/2005 | Ferretti | G02B 6/4471 385/88 |

(Continued)

FOREIGN PATENT DOCUMENTS

| | | | | |
|---|---|---|---|---|
| JP | 2006267130 A | | 10/2006 | |
| JP | 2010217854 A | * | 9/2010 | ........... C09K 11/665 |
| WO | WO-0016145 A1 | * | 3/2000 | ........... G02B 6/3807 |

OTHER PUBLICATIONS

PCT International Search Report and Written Opinion dated Aug. 1, 2023 for PCT/US2023/018625.

*Primary Examiner* — Kaveh C Kianni
(74) *Attorney, Agent, or Firm* — McCarter & English, LLP

(57) ABSTRACT

An example system for fiber connector assembly is provided. The system includes an adapter configured to at least partially receive a plug housing subassembly. The system includes a base station configured to receive the adapter, the plug housing subassembly, and a first backshell component. The base station includes structural features designed to align and maintain a position of the plug housing subassembly relative to the first backshell component prior to securing a second backshell component to the first backshell component.

20 Claims, 13 Drawing Sheets

(56) References Cited

U.S. PATENT DOCUMENTS

| | | | |
|---|---|---|---|
| 2012/0033922 A1* | 2/2012 | Nakagawa | G02B 6/3879 29/762 |
| 2015/0043873 A1* | 2/2015 | Li | G02B 6/3888 385/81 |
| 2015/0063761 A1* | 3/2015 | Hallett | G01M 11/30 356/73.1 |
| 2016/0209599 A1* | 7/2016 | Van Baelen | G02B 6/38875 |

* cited by examiner

SYSTEM FOR FIBER CONNECTOR ASSEMBLY

CROSS-REFERENCE TO RELATED APPLICATIONS

This application claims the benefit of a commonly assigned U.S. Provisional Patent Application No. 63/331,995, which was filed on Apr. 18, 2022. The entire content of the foregoing provisional application is incorporated herein by reference.

BACKGROUND

A variety of connectors are used with fiber optic cables in the telecommunications industry. During manufacturing, the fibers of the fiber optic cable are generally passed into backshell components with an operator positioning each of the ferrules in the desired positions. Manually positioning the ferrules in the proper position in an accurate and consistent manner can be difficult, resulting in potential inconsistencies among the assembled connectors. Such inconsistencies can result in undetectable damage that leads to poor performance and/or reliability issues.

SUMMARY

Embodiments of the present disclosure provide an exemplary system for fiber connector assembly. The system includes a stub adapter capable of receiving a plug housing and an internal brace, a base station that precisely positions/aligns the lower backshell half and the stub adapter with the terminated components, and a hand tool for delicate and accurate maneuvering of the brace to seat it properly in the lower backshell half. The system allows for repeatedly accurate assembly of the fiber connector, reducing the risk of component damage or erroneous assembly. In some embodiments, the base station can be placed on a rotatable index plate to allow operators to turn the base station to an orientation most comfortable to the operator, thereby further improving the accuracy of the assembly process. Although discussed herein as used to assemble an 8-fiber alignment independent multifiber (AIM) trunk connector, it should be understood that the system could be adapted for assembly of other types of fiber connectors.

In accordance with embodiments of the present disclosure, an exemplary system for fiber connector assembly is provided. The system includes an adapter configured to at least partially receive a plug housing subassembly. The system includes a base station configured to receive the adapter, the plug housing subassembly, and a first backshell component. The base station includes structural features designed to align and maintain a position of the plug housing subassembly relative to the first backshell component prior to securing a second backshell component to the first backshell component.

The plug housing subassembly can be a terminated plug housing subassembly including a plug housing and an internal brace. The adapter can include a rear housing detachably coupled and/or engaged with a front housing. The front housing is configured to at least partially receive the plug housing subassembly. The front housing can include a body with an opening formed in a front face of the body and extending into a hollow interior of the body. The front housing can include an array of alignment sleeves (e.g., 8 sleeves, or the like) extending from a rear wall within the hollow interior of the body. Each of the alignment sleeves of the array of alignment sleeves configured to receive and support a fiber ferrule. In some embodiments, each alignment sleeve of the array of alignment sleeves can include an inner surface fabricated from, covered by or coated with zirconia ceramic or phosphor bronze.

The base station can include a primary section and a secondary section extending from the primary section. The primary section can define an enclosure configured to at least partially receive the adapter. The primary section can include a base with raised blocks extending vertically on opposing sides of the base. The raised blocks can define a narrowed section within the enclosure complementary to outer surfaces of the adapter. The base station can include a raised step along a base surface at a transition between the primary section and the secondary section. The raised step is configured to abut a front face of the adapter and an inner surface of a rear wall of the primary section is configured to abut a rear face of the adapter during assembly of the adapter with the base station.

The secondary section can include a backshell support including a cable support section and outwardly flanged walls extending from the cable support section. The outwardly flanged walls define interior surfaces complementary to outer surfaces of the first backshell component. The outwardly flanged walls can face the primary section of the base station. The secondary section can include raised platforms on opposing sides of a top surface. The raised platforms are spaced by a gap. The gap is dimensioned complementary to a section of the first backshell component to ensure alignment of the first backshell component relative to the base station during assembly.

The base station can include a cover pivotably coupled to the primary section. The cover is configured to abut a front face of the adapter to maintain alignment and positioning of the adapter and the plug housing subassembly relative to the first backshell component. Pivoting of the cover into a closed position over the adapter simultaneously prevents movement of the adapter, the plug housing subassembly, and the first backshell component relative to the base station. In some embodiments, the system can include a hand tool for manipulating a position of one or more components (e.g., an internal brace) of the plug housing subassembly at least partially received by the adapter. In such embodiments, the tool can include a handle and a distal end with a V-shaped cutout complementary to an edge of the one or more components of the plug housing subassembly In accordance with embodiments of the present disclosure, an exemplary system for fiber connector assembly is provided. The system includes an adapter configured to at least partially receive a plug housing subassembly. The system includes a first backshell component configured to at least partially receive the plug housing subassembly. The system includes a second backshell component configured to at least partially receive the plug housing subassembly. The system includes a base station configured to receive the adapter, the plug housing subassembly, and the first backshell component. The base station includes structural features designed to align and maintain a position of the adapter and the plug housing subassembly relative to the first backshell component prior to securing the second backshell component to the first backshell component.

In accordance with embodiments of the present disclosure, an exemplary method of fiber connector assembly is provided. The method includes at least partially positioning a plug housing subassembly into an adapter of a fiber connector assembly system. The method includes positioning a first backshell component of a fiber connector onto the base station of the fiber connector assembly system. The method includes positioning the adapter and the plug housing subassembly onto the base station. The method includes aligning a position of the plug housing subassembly relative to the first backshell component. The method includes maintaining the aligned position of the plug housing subassembly relative to the first backshell component with structural features of the base station prior to securing a second backshell component to the first backshell component Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the system for fiber connect assembly, reference is made to the accompanying figures, wherein.

DETAILED DESCRIPTION

The system for fiber connector assembly discussed herein provides an assembly tool station that combines multiple tools and fixtures together in a single system that provides for consistent assembly of fiber connectors, such as the AIM connector. The system provides for an efficient and accurate assembly of such fiber connectors, resulting in a simplification and improvement of the connector assembly process (as compared to traditional assembly by operators). The system generally includes an adapter (e.g., a stub adapter) configured to receive a terminated plug housing and an internal brace. In some embodiments, the adapter can receive a terminated subassembly including the plug housing and the internal brace. The system includes a base station configured to receive the assembly of the adapter and the terminated subassembly. The base station is further configured to receive a backshell half of the connector. The base station includes structural features and/or components that ensure alignment of the adapter, the terminated subassembly, and the backshell half relative to each other, and includes a hinged top or cover that maintains the position/alignment of the assembled components relative to each other.

The system includes a positioning hand tool with a tapered end to catch on the rear edge of the internal brace of the terminated subassembly, enabling delicate maneuvering of the internal brace to seat the brace properly in the backshell half supported by the base station. Using the noted components or elements of the system, the repeated accurate assembly of the fiber connector is simplified and ensured, reducing the risk of component damage and/or erroneous assembly. In some embodiments, the base station can be placed on a rotatable index plate to allow the individual operators to turn the base station to an orientation that is most comfortable to the operator, providing greater flexibility and accuracy in the assembly/manufacturing process.

Figure 1:
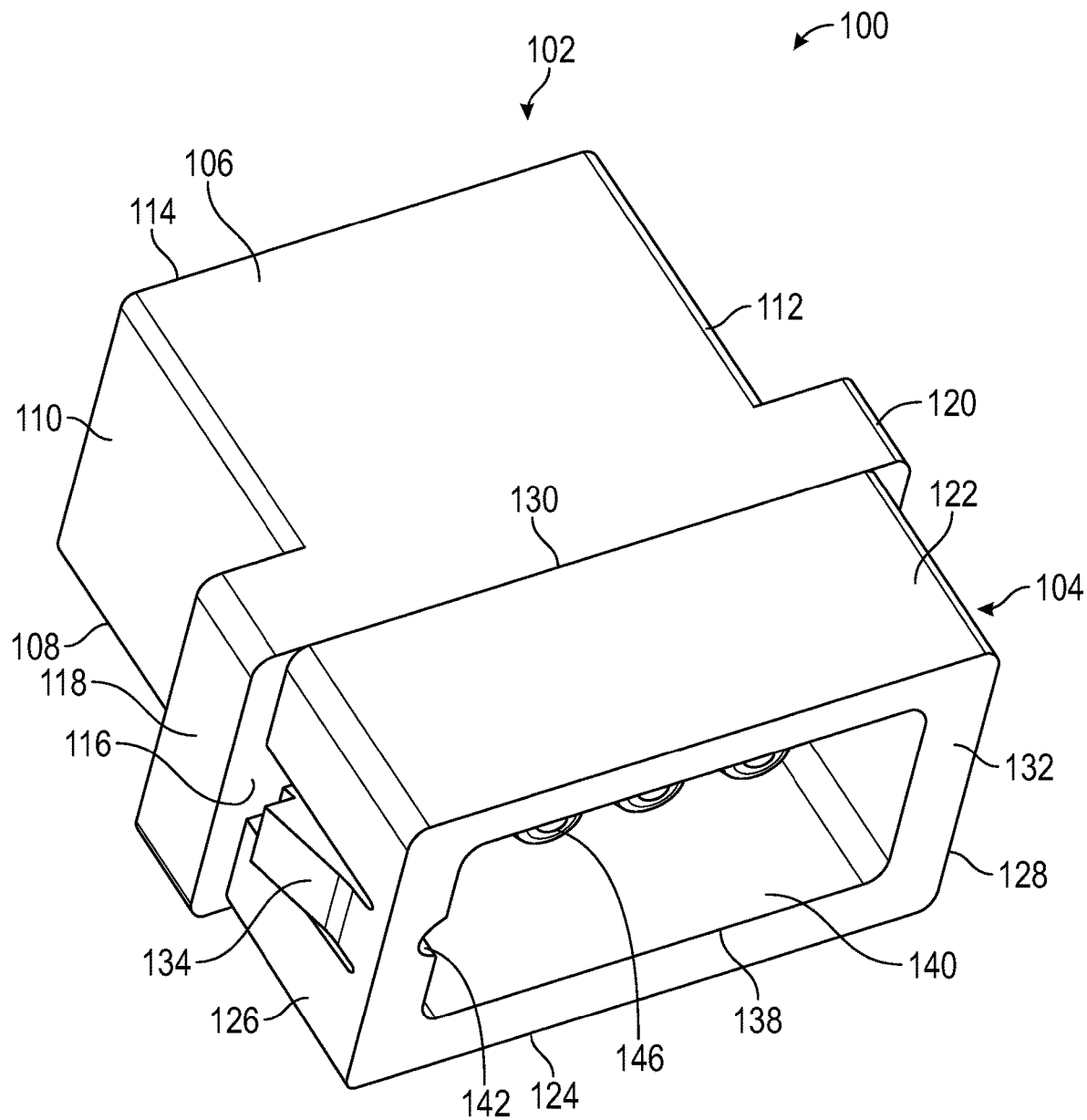
FIG. 1 is a perspective view of an adapter in an exemplary embodiment.
Figure 2:
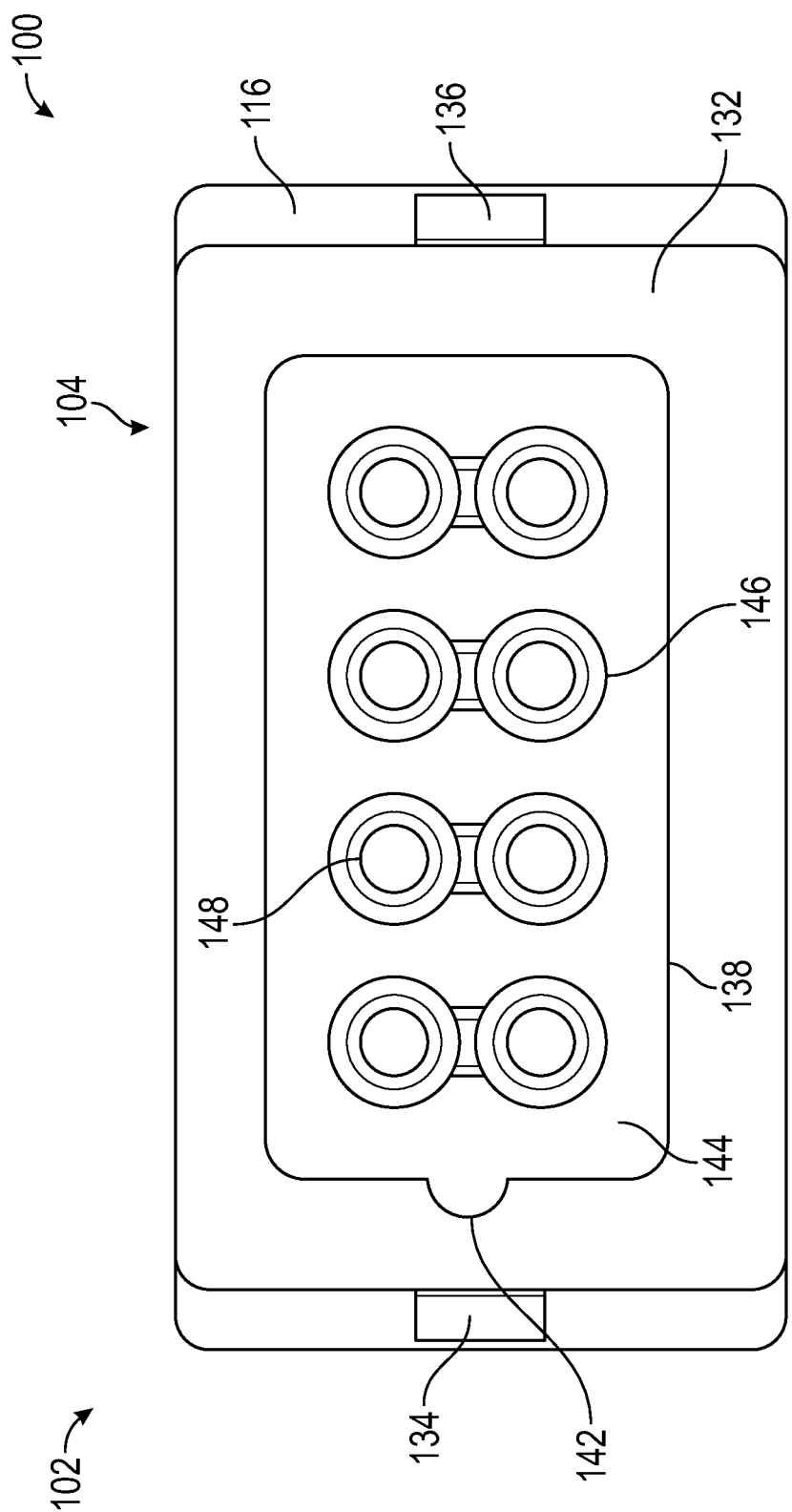
FIG. 2 is a front view of an adapter of FIG. 1.

FIGS. 1-2 are perspective and front views of an exemplary adapter 100 of a system for fiber connector assembly of the present disclosure. When used for assembly of an AIM fiber connector, the adapter 100 is configured as an AIM-to-4xMDC conversion adapter. However, when used for assembly of different fiber connectors, the adapter 100 can include an interface complementary to such other fiber connectors. The adapter 100 includes a rear housing 102 detachably coupled to a front housing 104. The rear housing 102 generally includes a body with a top surface 106, an opposing bottom surface 108, opposing side surfaces 110, 112, and opposing rear and front faces 114, 116. The rear housing 102 includes two flanges 118, 120 extending from the side surfaces 110, 112 and aligned with the front face 116, such that the front face 116 width is dimensioned greater than the width of the rear face 114.

In some embodiments, the rear housing 102 can define a substantially T-shaped configuration. It should be understood that the rear housing 102 can define a different configuration and does not need to define a specific form, so long as the rear housing 102 can engage with the front housing 104. In addition, the rear housing 102 does not need to mimic the 4xMDC interface, and was instead used in the present embodiment due to a large number of convenient indexing surfaces provided by the rear housing 102. The configuration of the rear housing 102 can be selected to include structural elements and/or contours that assist with accurately locating the adapter 100 within the base station.

The front face 116 of the rear housing 102 includes an opening (not visible due to assembly with front housing 104) formed therein, the opening complementary to a rear extension of the front housing 104. The front housing 104 generally includes a body with a top surface 122, an opposing bottom surface 124, opposing side surfaces 126, 128, and opposing rear and front faces 130, 132. The front housing 104 generally defines a rectangular block configuration. In some embodiments, the side surfaces 126, 128 can each include a latch 134, 136. In some embodiments, the latches 134, 136 can assist in indexing the adapter 100 relative to the base station during the assembly process. In some embodiments, the front housing 104 can be free of latches 134, 136. The front housing 104 can include an extension (not visible) protruding from the rear face 130 and complementary to the opening in the front face 116 of the rear housing 102 to assist with alignment of the front housing 104 relative to the rear housing 102 during assembly. The front housing 104 can be slidably removed from the rear housing 102 as needed, and can generally be maintained in the assembled configuration via, e.g., friction.

The front housing 104 includes an opening 138 formed in the front face 132 and extending into a hollow interior 140. The opening 138 generally defines a rectangular perimeter, with one side of the opening 138 including an outwardly extending alignment groove 142. The groove 142 corresponds with a complementary protrusion in the connector plug housing to be inserted into the opening 138, ensuring the correct orientation of the connector plug housing during assembly. The hollow interior 140 extends to a rear inner wall 144. The front housing 104 includes an array of alignment sleeves 146 extending from the rear inner wall 144 towards the front face 132. In the embodiment of FIGS. 1-2, the front housing 104 includes eight alignment sleeves 146 to correspond with eight ferrules of a corresponding AIM connector. However, the front housing 104 can include a greater or lower number of sleeves 146 depending on the type of connector being assembled.

Each alignment sleeve 146 includes an opening 148 extending therethrough to receive and hold the terminated ferrules in the plug housing to be assembled with the adapter 100. The openings 148 ensure that the ferrules are maintained straight and secure during the assembly process. The openings 148 and/or alignment sleeves 146 can be fabricated from zirconia ceramic or phosphor bronze. After extended usage of the adapter 100, the zirconia ceramic or phosphor bronze may wear over time. In some embodiments, if such wear occurs and/or if the alignment sleeves 146 are damaged, the front housing 104 can be easily disengaged from the rear housing 102 and replaced with a new front housing 104 that can be engaged with the rear housing 102 for continued use. In some embodiments, if such wear occurs and/or if the alignment sleeves 146 are damaged, the entire adapter 100 can be replaced (e.g., the rear and front housings 102, 104 cannot be disengaged from each other).

Figure 3:
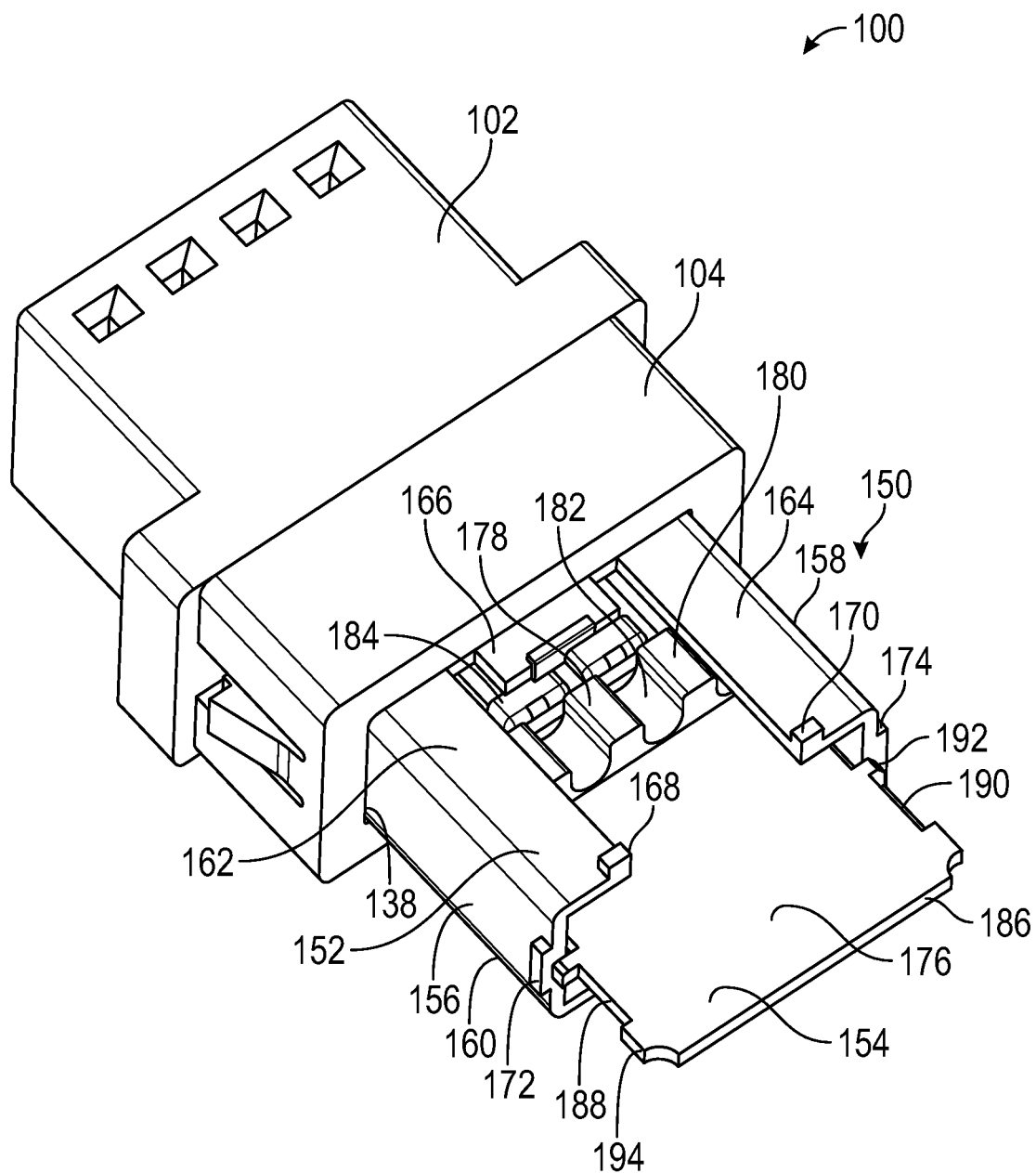
FIG. 3 is a perspective view of an adapter of FIG. 1 including a terminated plug subassembly.
Figure 4:
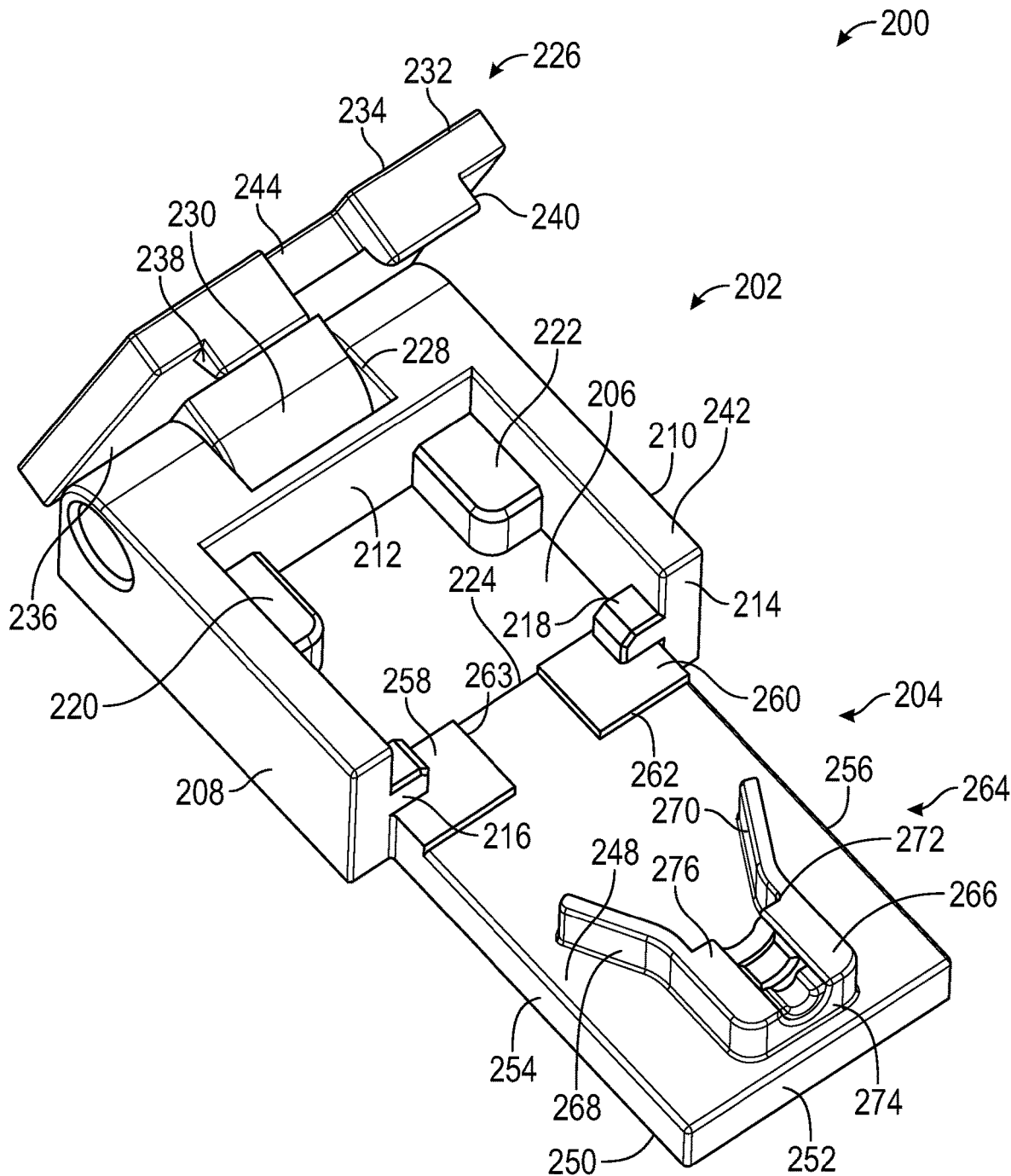
FIG. 4 is a perspective view of a base station in an exemplary embodiment.
Figure 5:
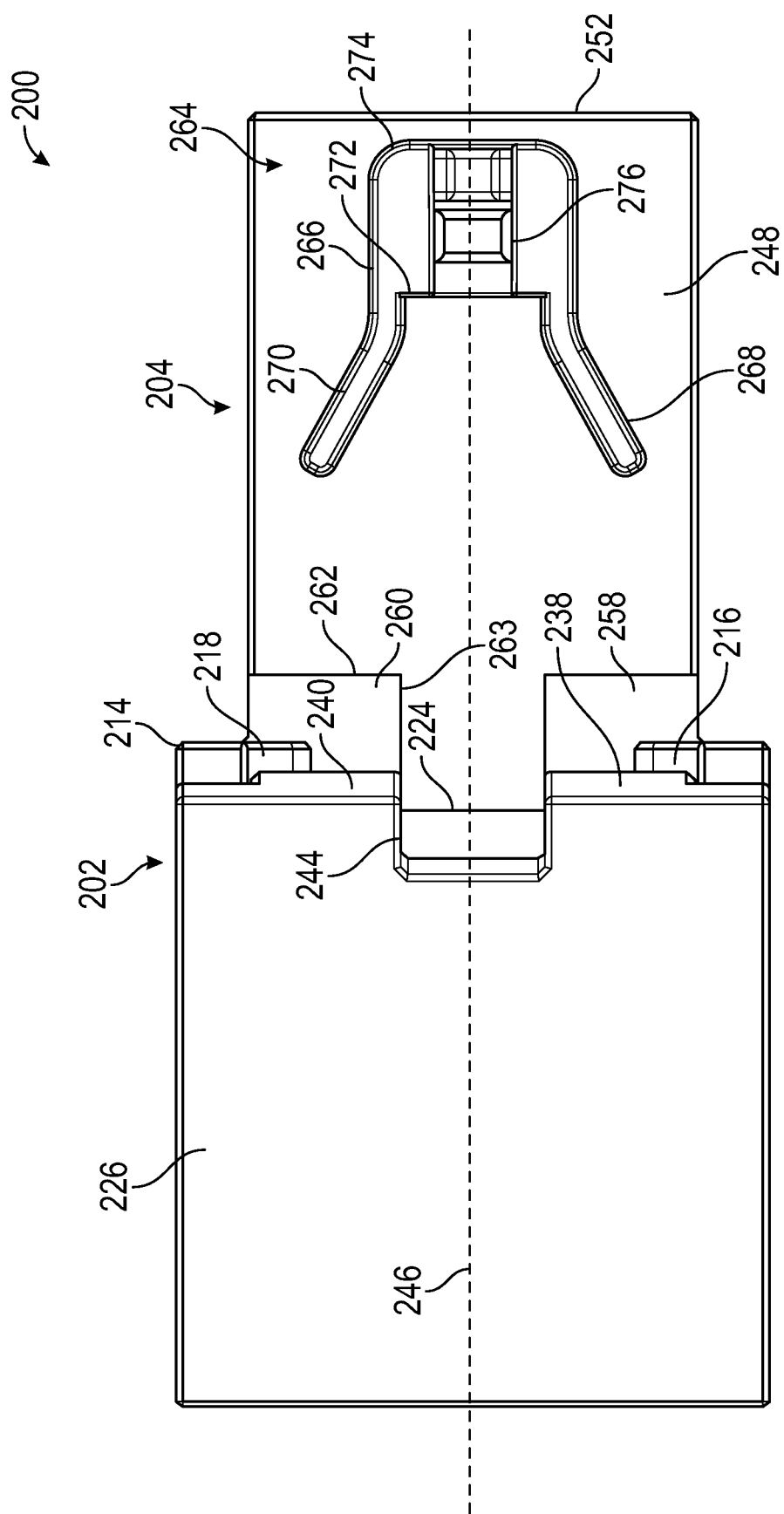
FIG. 5 is a top view of a base station of FIG. 4.
Figure 6:
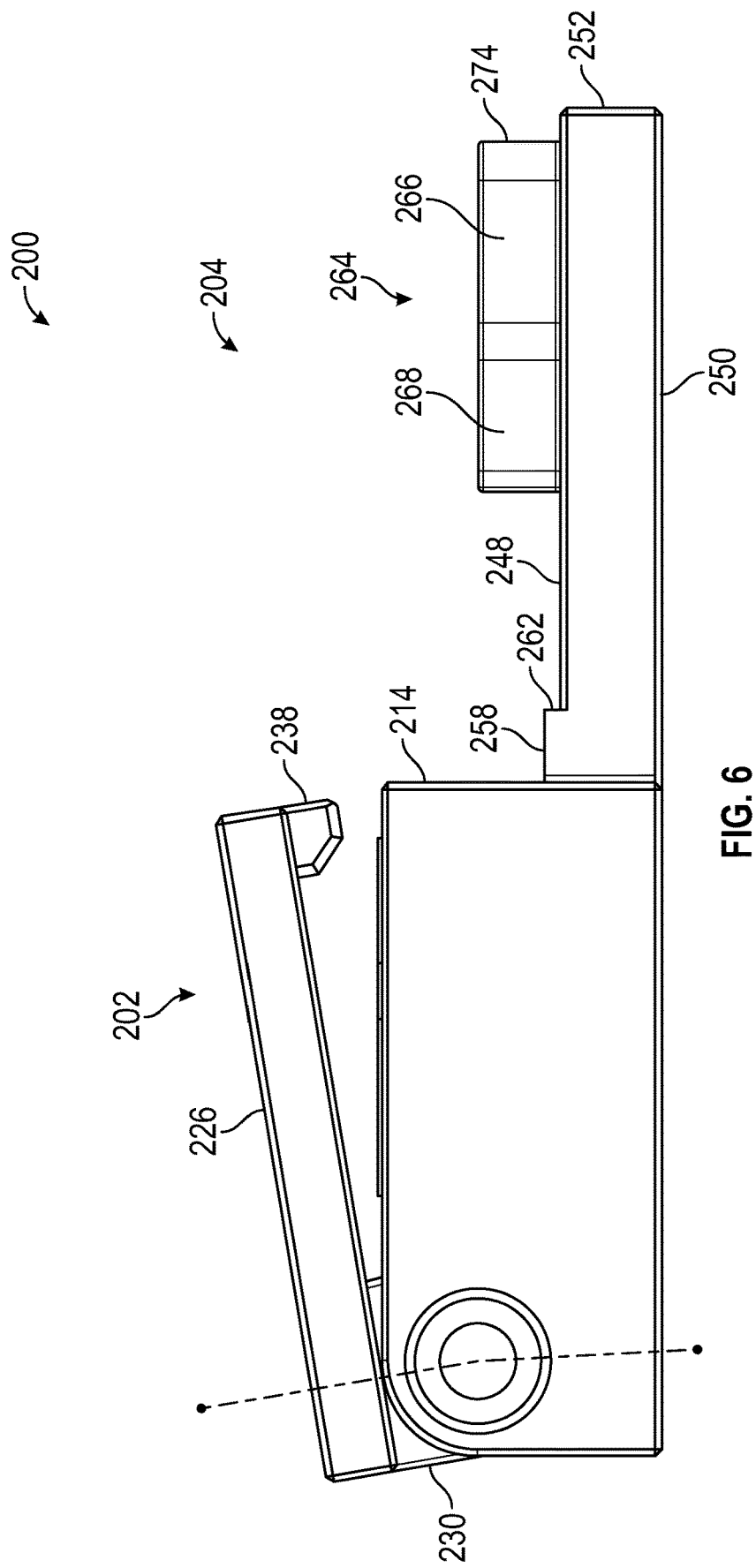
FIG. 6 is a side view of a base station of FIG. 4.
Figure 7:
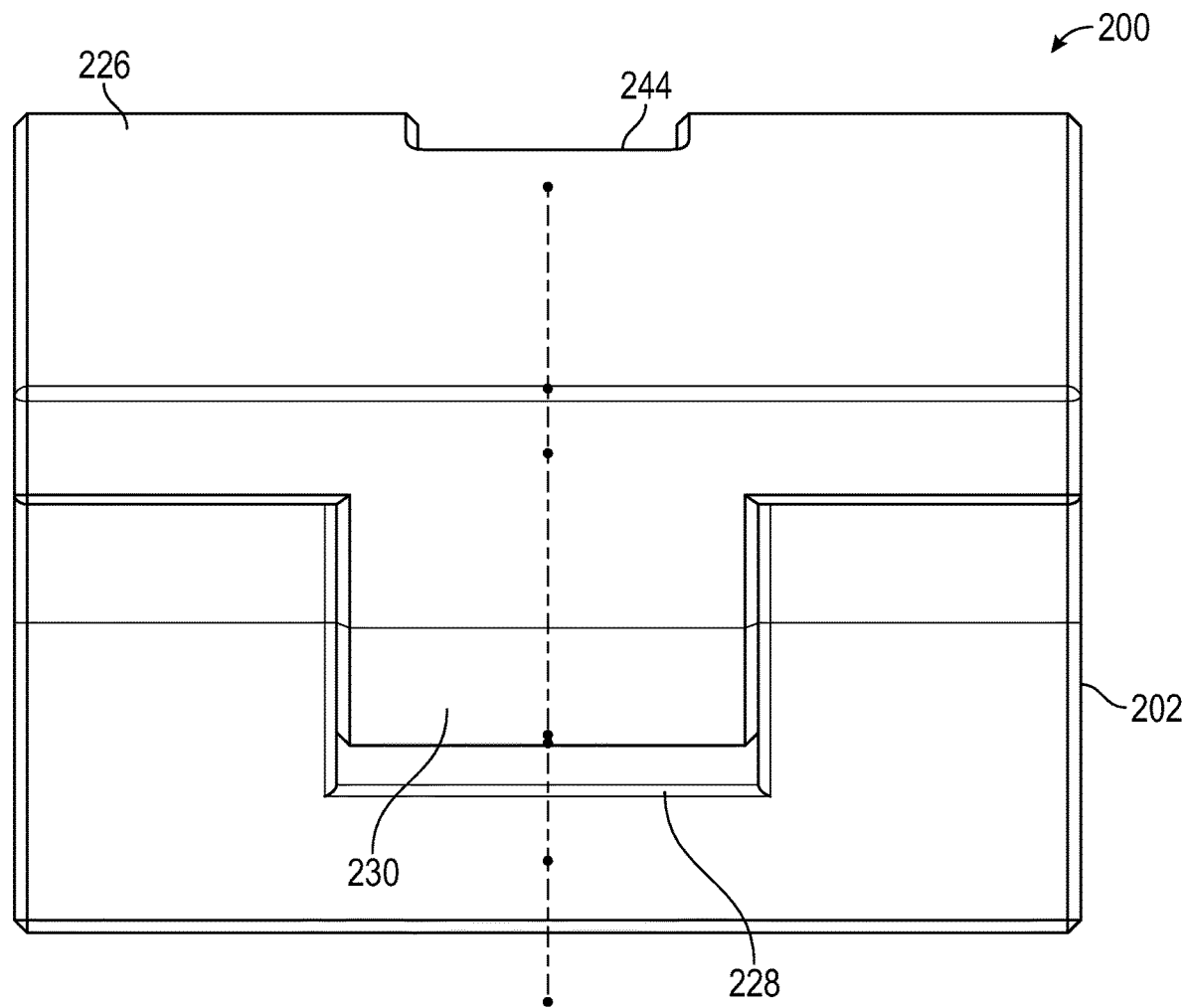
FIG. 7 is a rear view of a base station of FIG. 4.

FIG. 3 is a perspective view of the adapter 100 and a terminated plug subassembly 150 inserted into the adapter 100. The subassembly 150 generally includes a plug housing 152 and an internal brace 154 inserted and/or coupled relative to the plug housing 152. The plug housing 152 can including opposing side walls 156, 158, a bottom wall 160 connecting the side walls 156, 158, and a top surface defined by first and second top wall sections 162, 164 connecting the side walls 156, 158. The first and second top wall sections 162, 164 are spaced from each other by a gap or notch formed in the top surface. However, the top wall sections 162, 164 extend along the same plane and are structurally connected by a central wall section (not visible) such that the top surface forms a single structure. The top wall section 162 extends substantially perpendicularly from the side wall 156 towards the top wall section 164, and the top wall section 164 extends substantially perpendicularly from the side wall 158 towards the top wall section 162.

The plug housing 152 includes a tab 166 extending from the top surface into the gap or notch formed in the top surface. The tab 166 can assist in positioning and/or aligning the top backshell half relative to a bottom backshell half during assembly of the connector. Although FIG. 3 illustrates the top surface of the subassembly 150, it should be understood that the bottom/opposing surface of the subassembly 150 can be a mirror image of the top surface of the subassembly 150. In some embodiments, the depth of the opening 138 in the front housing 104 can be reduced to prevent latching/coupling of the plug housing 152 with the front housing 104 during use.

The side walls 156, 158, bottom wall 160, and top wall sections 162, 164 define an internal space configured to at least partially receive the internal brace 154. The proximal or end face of the plug housing 152 can include one or more extensions or flanges 168-174 protruding from the walls 156, 158, 160 and wall sections 162, 164. For example, the flanges 168, 170 can extend from the proximal corners of the top wall sections 162, 164, and the flanges 172, 174 can extend from the proximal edges of the side walls 156, 158.

The internal brace 154 includes a planar proximal section 176 and includes a guiding block 178 at a proximal end. The guiding block 178 includes peaks 180 and valleys 182 configured to at least partially receive and/or support ferrules 184 and/or fibers from a fiber cable to be terminated. It should be understood that the internal brace 154 has the same guiding block 178 disposed on the opposing bottom surface of the internal brace 154, with each guiding block 178 configured to support four fibers of a fiber cable (e.g., a mirror image of the top surface of the internal brace 154). Although not illustrated, at this stage of the assembly process, the connector would be terminated to a fiber cable, and four fibers each would be routed to the individual fiber positions above and below the internal brace 154, connecting with the respective ferrules 184.

The internal brace 154 can define a substantially planar proximal edge 186, and the opposing side edges 188, 190 can each include protrusions or flanges 192, 194 extending perpendicularly therefrom. The flanges 192, 194 can be spaced from each other, with the flanges 192 positioned at or near a midpoint of the section 176 and the flanges 194 positioned at or near the proximal edge 186. During insertion of the internal brace 154 into the plug housing 152, the flanges 192 can abut the proximal face of the plug housing 152, thereby acting as a stop to ensure proper positioning of the internal brace 154 during assembly. As illustrated in FIG. 3, the subassembly 150 is inserted into the opening 138 of the adapter 100 before proceeding to the next step of assembly of the fiber connector.

FIGS. 4-7 are perspective, top, side and rear views of a base station 200 of the present disclosure. The base station 200 includes features and/or contours configured to receive a backshell half and the adapter 100 loaded with the subassembly 150. The base station 200 includes a distal or primary section 202 and a proximal or secondary section 204 extending from the section 202. The section 202 includes a base 206 defining a substantially planar surface, side walls 208, 210 extending perpendicularly on opposing sides of the base 206, and a distal or rear wall 212 connecting the side walls 208, 210. The base 206 and walls 208-212 define a hollow interior configured to at least partially receive the loaded adapter 100. The front surface or face 214 of the section 202 includes an opening extending into the hollow interior.

The section 202 includes two inwardly facing protrusions 216, 218 extending from the inner surface of the side walls 208, 210. The protrusions 216, 218 are aligned with the front face 214 of the section 202, and extend towards each other at the opening leading to the hollow interior. The section 202 includes a raised block 220, 222 at each of the rear or distal corners extending from the base 206. The blocks 220, 222 are positioned at the intersection of the side wall 208 and the rear wall 212, and the side wall 220 and the rear wall 212, and define a narrower gap between the blocks 220, 222 as compared to the space between the walls 208, 210. The protrusions 216, 218 and blocks 220, 222 can extend an equal partial height of the side walls 208, 210. The section 202 includes a raised step 224 formed in the base 206 at or near the face 214, defining the connection to the section 204.

The planar surface area of the base 206, the contours provided by the inner surfaces of the walls 208-212, and the contours of the raised blocks 220, 222 are configured and dimensioned complementary to the outer surfaces of the adapter 100. (See, e.g., FIG. 9). For example, the adapter 100 can be loaded into the section 202 such that the rear face 114 of the rear housing 102 abuts the rear wall 212, and the front face 132 (or bottom edge of the front face 132) of the front housing 104 abuts the raised step 224, ensuring proper positioning of the adapter 100 within the base station 200.

The section 202 includes a lid or cover 226 hingedly coupled to the rear wall 212. The rear wall 212 includes a cutout 228 configured to movably or rotatably receive a pivot section 230 extending from a body 232 of the cover 226. The body 232 of the cover 226 generally defines a planar top surface 234 and a planar opposing bottom surface 236. The front face or edge of the cover 226 includes downwardly directed flanges 238, 240. When the cover 226 is pivoted into the closed position (see, e.g., FIG. 10), the flanges 238, 240 substantially align with and are positioned over the protrusions 216, 218. The cover 226 and flanges 238, 240 are dimensioned such that when the cover 226 is in the closed position, the inner surfaces of the flanges 238, 240 abut against the front face 132 of the front housing 104, thereby securing the proper position of the adapter 100 within the base station 200. In the closed position, the bottom surface 236 abuts against or is positioned immediately over the top surface 242 of the section 202. The cover 226 includes a U-shaped central cutout 244 at the front face and formed between the flanges 238, 240.

The section 204 extends perpendicularly from the first section 202 and is aligned along a central longitudinal axis 246 of the base section 200. The section 204 generally defines a planar, substantially rectangular body with a top surface 248, an opposing bottom surface 250, a front face 252, and opposing side walls 254, 256. From the raised step 224 (e.g., a transition section), the top surface 248 generally defines an equally planar surface up to the edge of the front face 252. On either side of the raised step 224 and adjacent to the extensions 216, 218, the section 204 includes raised platforms 258, 260 elevated above the top surface 248 and forming an L-shaped raised step 262. The platforms 258, 260 are separated from either other by a gap 263 along the top surface 248 and extending up to the raised step 224. The top surface 248 is therefore positioned higher than the base 206 surface, and the top surface of the platforms 258, 260 is positioned higher than the top surface 248 of the section 204.

The section 204 includes a backshell support 264 disposed on the top surface 248 at or near the front face 252. The backshell support 264 includes a cable support section 266 at a proximal end and two walls 268, 270 extending outwardly and distally from the cable support section 266. The space between the walls 268, 270 is therefore dimensioned smaller at the connection to the cable support section 266, and greater at the distal ends of the walls 268, 270. The backshell support 264 therefore defines a substantially Y-shaped configuration when viewed from above. The cable support section 266 includes a distal or rear face 272 and an opposing proximal or front face 274. The inner surfaces of the walls 268, 270 and the rear face 272 define a substantially triangular or trapezoidal space complementary to outer walls of a backshell half. The cable support section 266 includes a semi-circular groove 276 formed in the top surface and extending between the front and rear faces 274, 272. The groove 276 is configured to receive and support a fiber cable.

Figure 8:
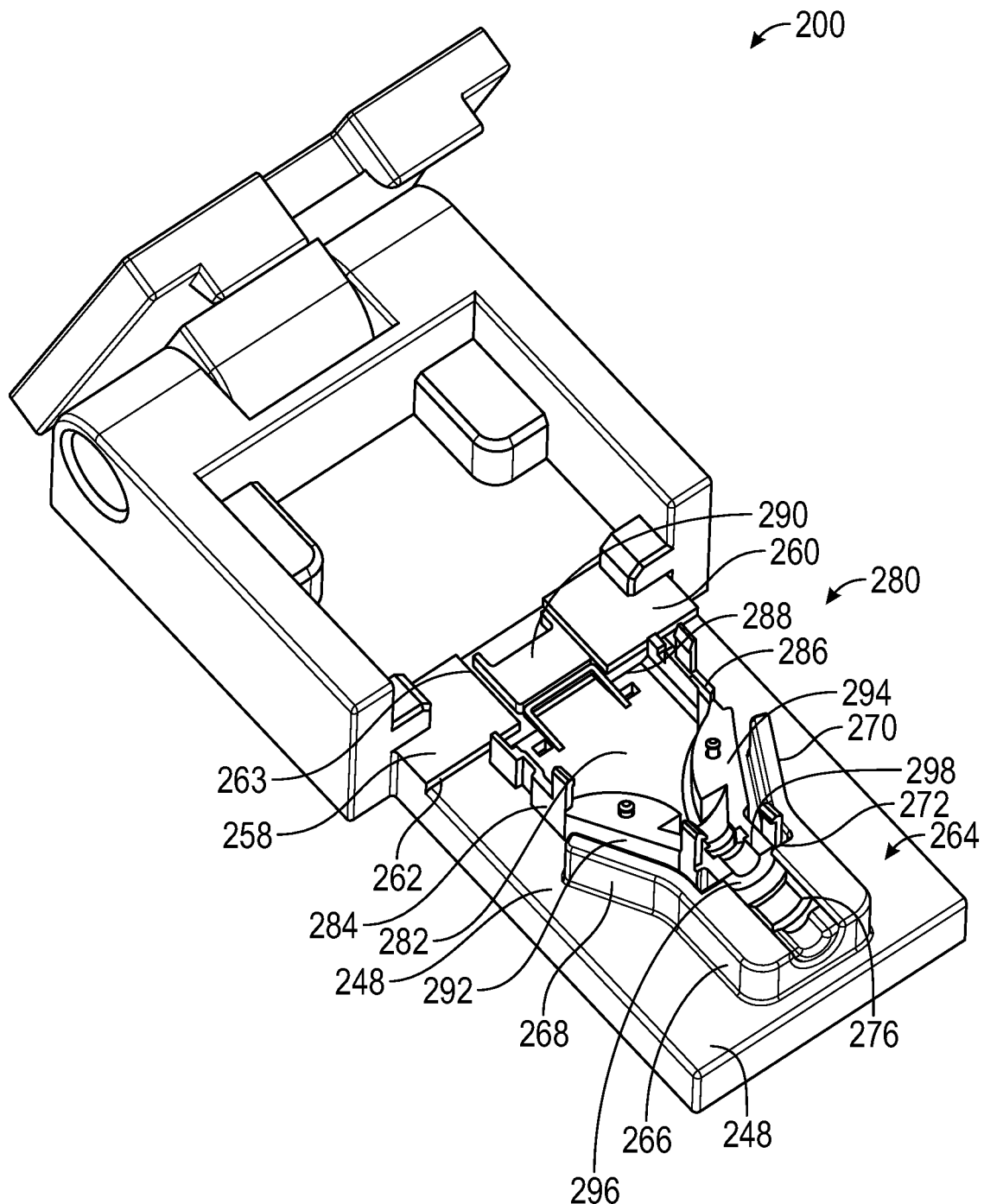
FIG. 8 is a perspective view of a base station of FIG. 4 including a backshell half.

FIG. 8 is a perspective view of the base station 200 loaded with a backshell half 280. The backshell half 280 includes a base 282 with opposing side walls 284, 286, the base 282 and walls 284, 286 defining a space configured and dimensioned to at least partially receive the terminated plug subassembly 150. The walls 284, 286 include upwardly directly extensions and/or latching flanges for engagement with opposing complementary extensions, latching flanges and/or grooves of a second backshell half. A distal edge 288 of the base includes a latching assembly 290 extending therefrom. The latching assembly 290 defines a smaller width than the width of the base 282, and is substantially complementary to the gap 263 formed between the raised platforms 258, 260 of the base station 200. The backshell half 280 includes raised proximal walls 292, 294 that define inwardly angled/narrowing outer surfaces and outwardly curved/convex inner surfaces.

The outer surfaces of the walls 292, 294 substantially correspond with the outwardly splayed configuration of the walls 268, 270 of the backshell support 264. The walls 268, 270 narrow up to a proximal face 296 of the backshell half 280. The top surface of the walls 292, 294 includes an inwardly formed groove 298 defining a crimping section for the fiber cable. During assembly, as illustrated in FIG. 8, the backshell half 280 can be positioned onto the top surface 248 of the base station 200 such that the latching assembly 290 extends within the gap 263 and the proximal face 296 abuts the rear face 272 of the cable support 266. The raised steps 262 of the platforms 258, 260, and the walls 268, 270 of the backshell support 264, ensure alignment of the backshell half 280 along the central longitudinal axis 246 of the base station 200.

Figure 9:
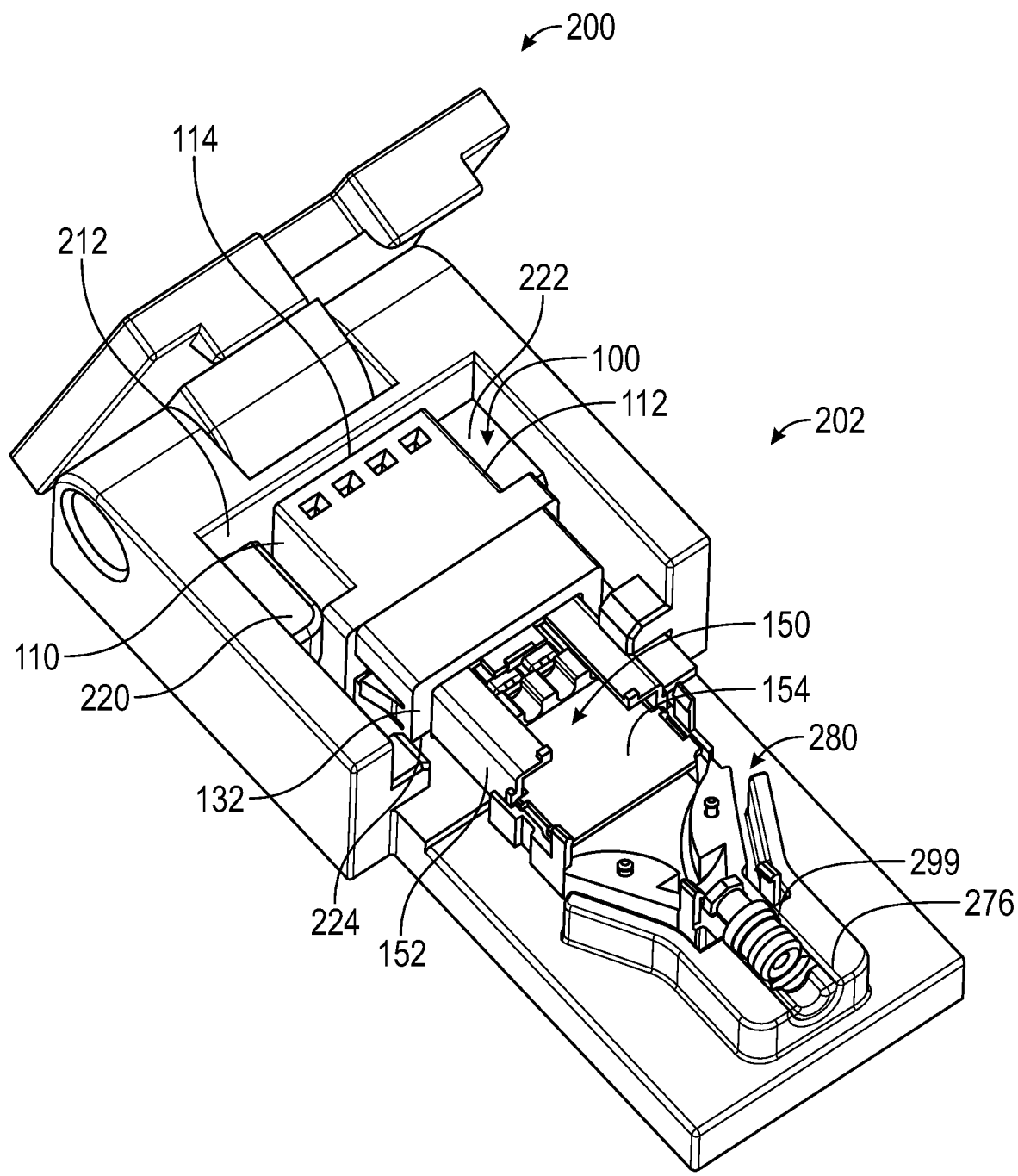
FIG. 9 is a perspective view of a base station of FIG. 4 in an open position, the base station including a backshell half and an adapter/terminated plug subassembly of FIG. 3.

FIG. 9 is a perspective view of the base station 200 loaded with the backshell half 280 and the adapter 100 assembled with the plug subassembly 150. After loading of the backshell half 280 into the base station 200, the adapter 100 and plug subassembly 150 can be loaded into the section 202 of the base station 200. The rear wall 214 of the adapter 100 abuts against the inner surface of the rear wall 212 of the base station 200, the side walls 110, 112 abut against respective blocks 220, 220, and the front face 132 of the adapter 100 abuts against the raised step 224 to maintain alignment of the adapter 100 along the central longitudinal axis 246 of the base station 200. The contours and components of the base station 200 therefore ensure accurate and repeatedly consistent alignment of the adapter 100 (and the plug subassembly 150) relative to the backshell half 280.

The plug housing 152 of the subassembly 150 is positioned over the backshell half 280, and the internal brace 154 is positioned between the walls 184, 186 of the backshell half 280 (e.g., within the hollow interior of the backshell half 180). The flanges 192, 194 on opposing sides of the internal brace 154 can assist with alignment or positioning of the subassembly 150 relative to the backshell half 280. The fibers associated with the fiber cable (not shown) terminated to the plug housing 152 can be routed through the interior passage of the backshell half 280, through the crimping section defined by the groove 298 of the backshell half 280, and along the groove 276 formed in the base section 200. A crimp anchor 299 can be positioned partially within the groove 298 and partially within the groove 276, and around the fiber cable, to allow for crimping of the fiber cable relative to the backshell half 280.

Figure 10:
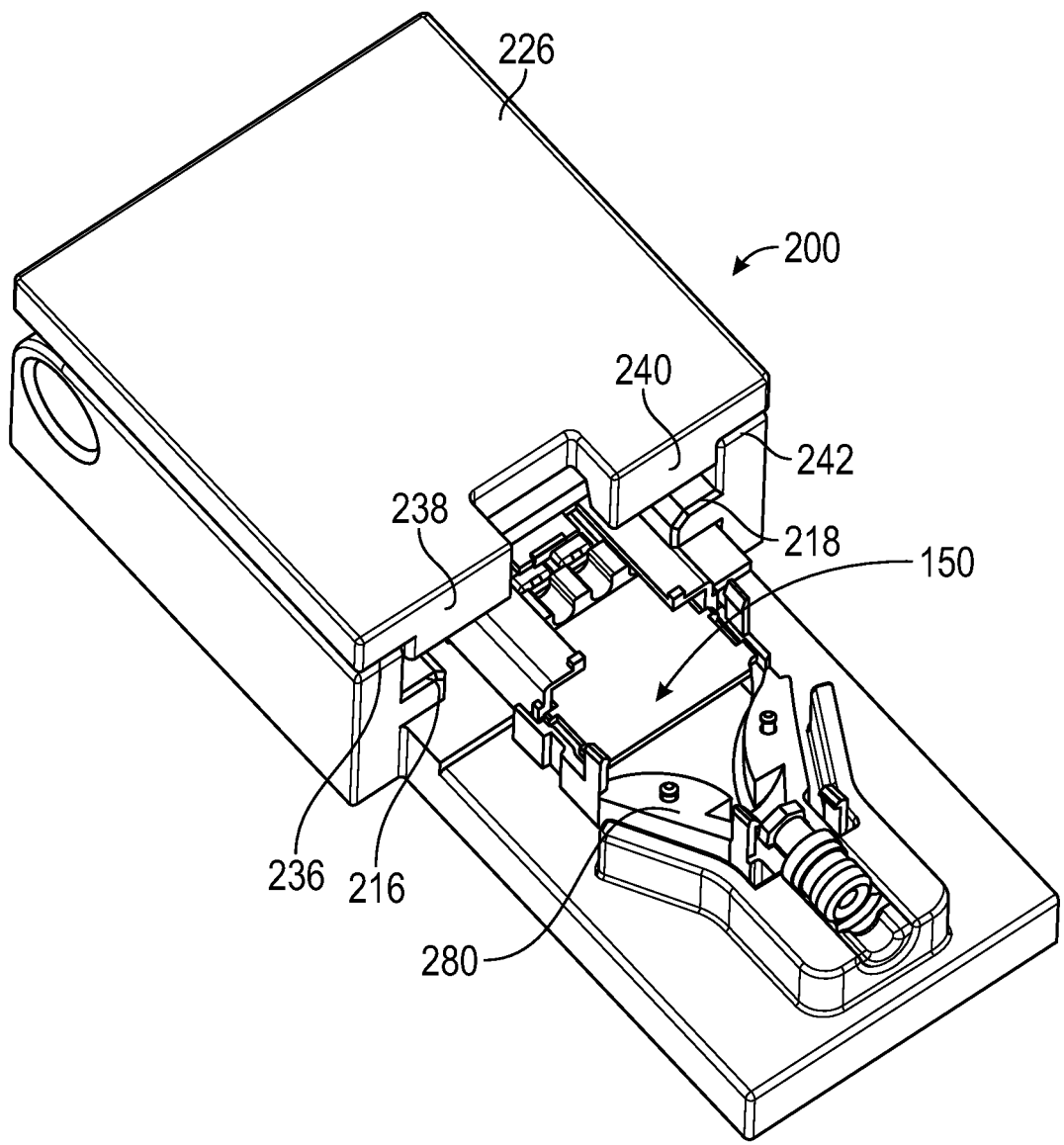
FIG. 10 is a perspective view of a base station of FIG. 4 in a closed position, the base station including a backshell half and an adapter/terminated plug subassembly of FIG. 3.

With the adapter 100, the subassembly 150, and the backshell half 280 properly positioned and loaded into the base section 200, as illustrated in FIG. 10, the cover 226 of the base section 200 is pivoted into a closed position to encase and fully cover the adapter 100. As discussed previously, the inwardly facing surfaces of the extensions 238, 240 abut the front face 132 of the adapter 100, thereby preventing undesired movement of the adapter 100 (and the subassembly 150) relative to the base station 200 and the backshell half 280. In particular, by maintaining the fixed position of the adapter 100, the subassembly 150 and the backshell half 280 are prevented from movement. The structure of the base station 200 and the adapter 100 (collectively referred to herein as the system) therefore ensure repeatedly consistent and accurate alignment of the assembly components.

Figure 11:
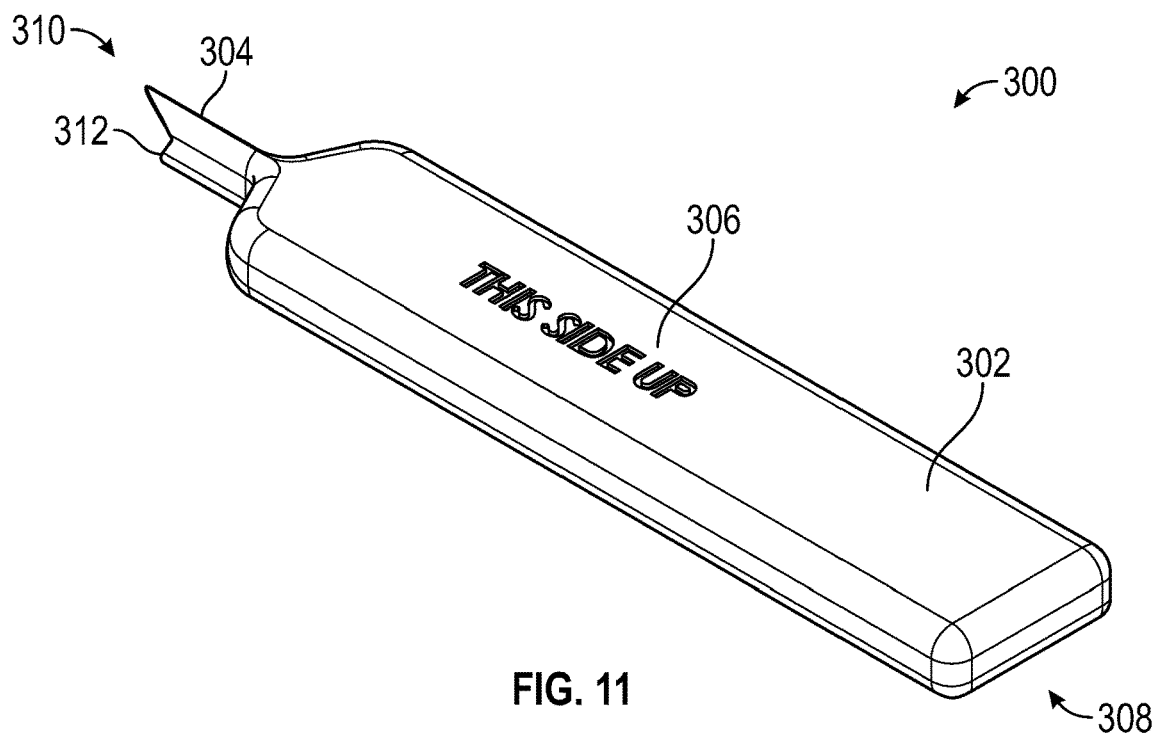
FIG. 11 is a perspective view of a positioning tool in an exemplary embodiment.
Figure 12:
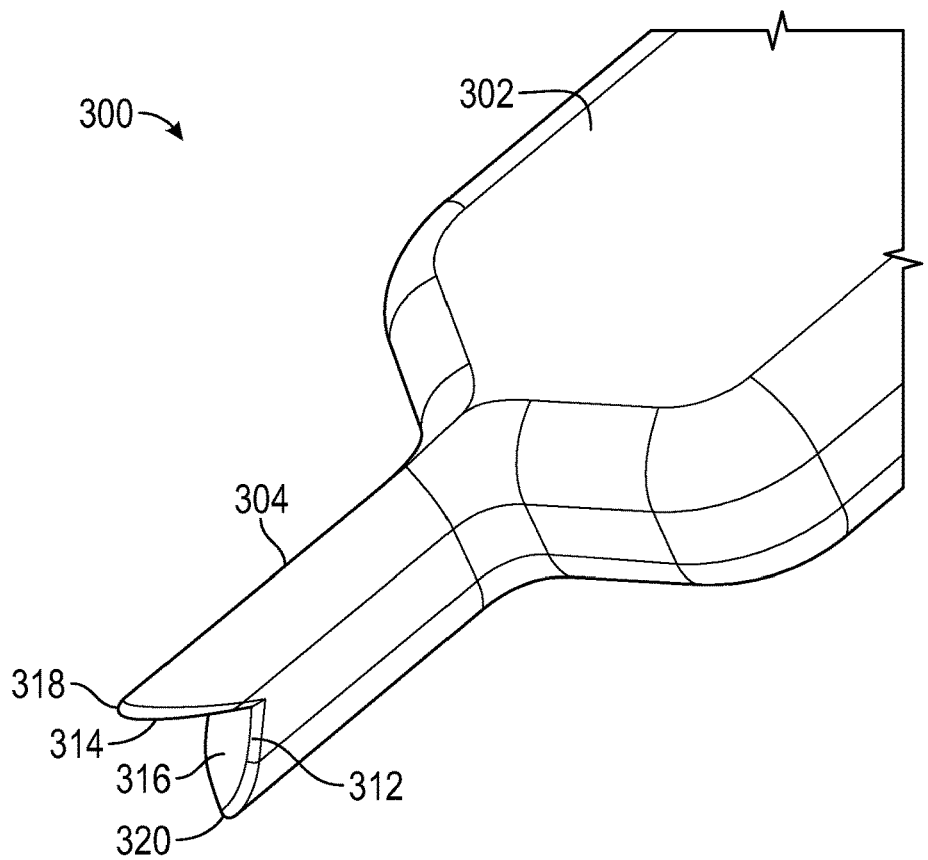
FIG. 12 is a detailed view of a positioning tool of FIG. 11.
Figure 13:
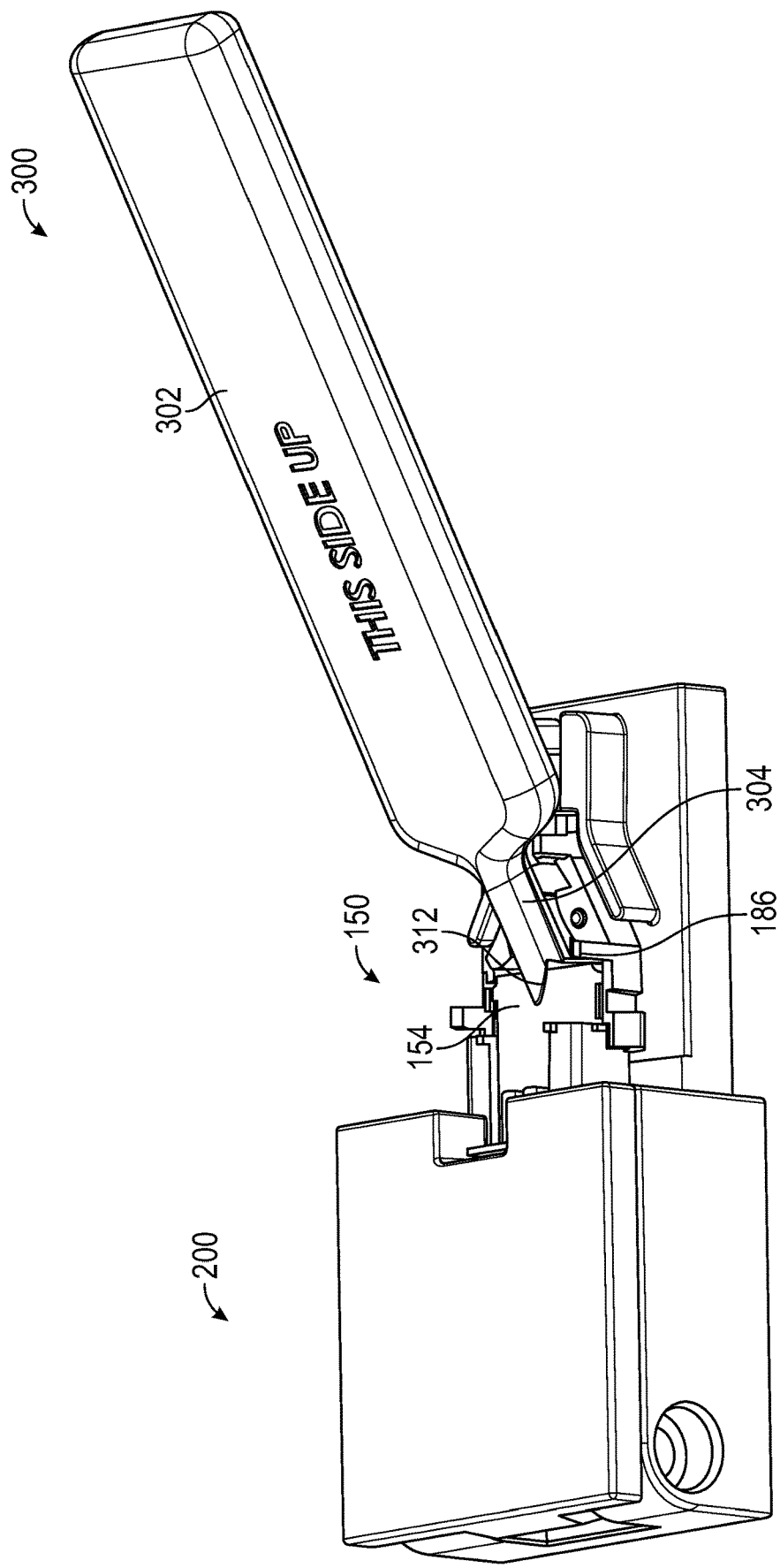
FIG. 13 is a perspective view of an assembly of a base station assembly of FIG. 10 and a positioning tool of FIG. 11.

In some embodiments, a positioning tool 300 (e.g., a hand tool) of FIGS. 11-13 can be used to assist with ensuring that the internal brace 154 is properly located relative to the backshell half 280. The tool 300 generally includes a body 302 defining the handle for maneuvering the tool 300, and an elongated section 304 protruding from the body 302 to define the tip of the tool 300. The body 302 includes an indicator 306 (e.g., text) on one surface to indicate to the operator the proper orientation of the tool 300. The body 302 includes a proximal end 308 and a distal end 310, with the section 304 extending from the distal end 310.

The tip of the section 304 includes a substantially V-shaped cutout 312 defining inwardly directed tapered surfaces 314, 316, and opposing tips 318, 320. The bottom tapered surface 316 can define a greater surface area than the surface area of the top tapered surface 314. In some embodiments, the surface 316 can be dimensioned longer than the surface 314 as measured from the connection between the surfaces 314, 316 and the respective tips 318, 320. The greater surface area and/or longer structure of the surface 316 can reduce potential slippage when the tool 300 is used to push against the rear surface or edge 186 of the internal brace 154. In particular, the cutout 312 forms a space complementary to the edge 186 of the internal brace 154.

As illustrated in FIG. 13, the cutout 312 can be positioned over the edge 186, and the tool 300 can be carefully maneuvered to ensure proper positioning or seating of the internal brace 154 relative to the backshell half 280. For example, the tool 300 allows for careful force to be applied to the edge 186 of the internal brace 154, preventing potential damage to fibers passing over the internal brace 154. Once the operator has positioned the internal brace 154 in the desired position, the tool 300 can be removed. It should be noted that use of the tool 300 is optional and is only needed if adjustment of the internal brace 154 position is desired.

Figure 14:
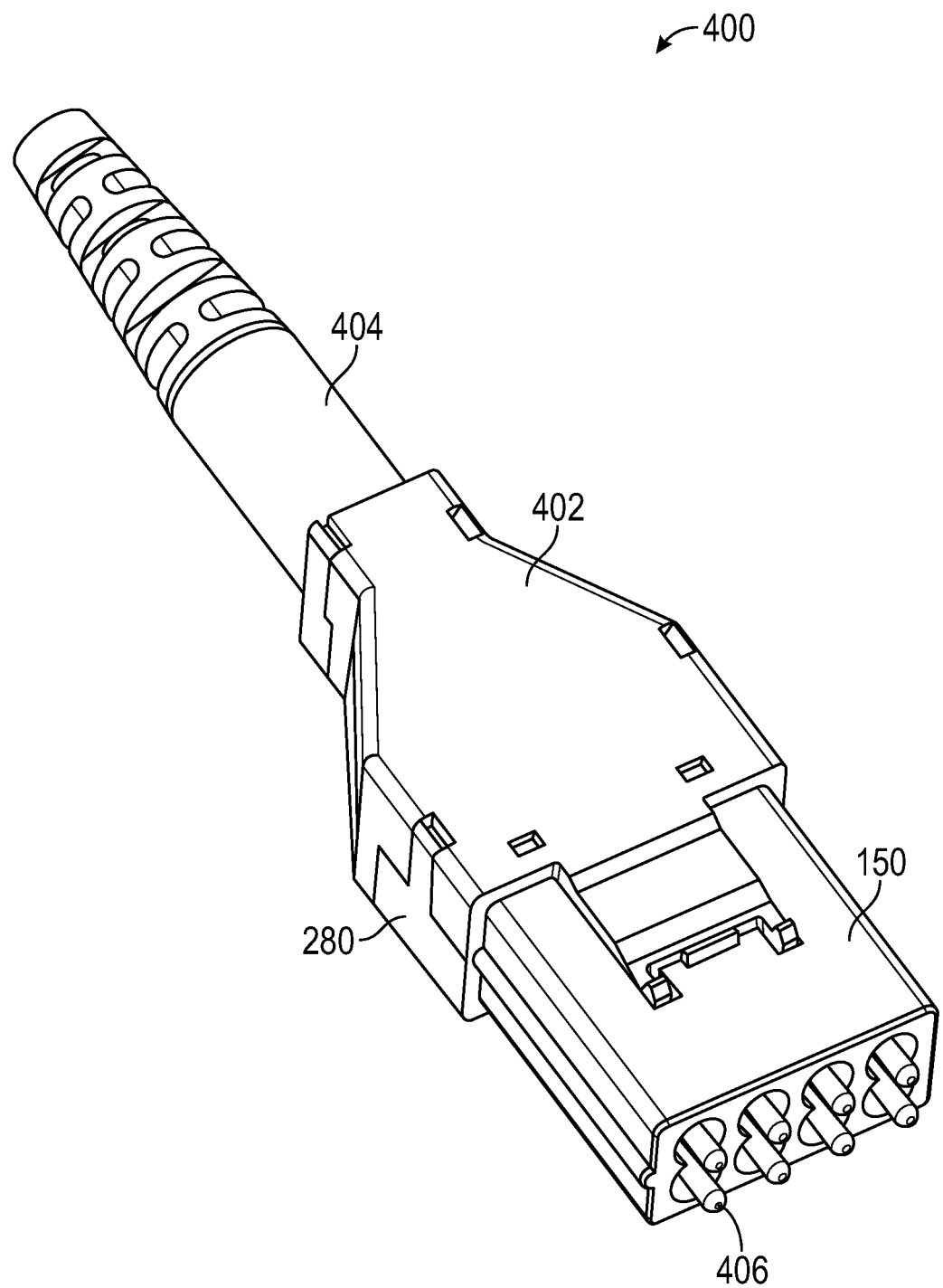
FIG. 14 is a perspective view of an assembled fiber connector in an exemplary embodiment.

After inspection of the subassembly, the operator can snap a second backshell half relative to the backshell half 280 by aligning the corresponding latching flanges/grooves. For example, FIG. 14 shows a fully assembled fiber connector 400 including the plug subassembly 150, the backshell half 280, and a second backshell half 402 coupled to the backshell half 280. The connector 400 includes a cable boot 404 that can be slid over a crimped fiber cable extending from the backshell halves 280, 402. Ferrules 406 extend from the proximal end of the connector 400. The exemplary system discussed herein therefore provides for a convenient, simplified and accurate means for assembling internal components of the connector 400, reducing the risk of misalignment/damage to internal components and/or erroneous assembly.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A system for fiber connector assembly, the system comprising:
   an adapter configured to at least partially receive a plug housing subassembly; and
   a base station configured to receive the adapter, the plug housing subassembly, and a first backshell component;
   wherein the base station includes structural features designed to align and maintain a position of the plug housing subassembly relative to the first backshell component prior to securing a second backshell component to the first backshell component;
   wherein the plug housing subassembly, the first backshell component and the second backshell component define an assembled fiber connector; and
   wherein the assembled fiber connector is configured to be removed from the adapter after the first backshell component and the second backshell component are coupled to the plug housing subassembly.

2. The system of claim 1, wherein the plug housing subassembly is a terminated plug housing subassembly including a plug housing and an internal brace.

3. The system of claim 1, wherein the adapter includes a rear housing engaged with a front housing, and wherein the front housing includes a body with an opening formed in a front face of the body and extending into a hollow interior of the body.

4. The system of claim 3, wherein the front housing includes an array of alignment sleeves extending from a rear wall within the hollow interior of the body, each of the alignment sleeves of the array of alignment sleeves configured to receive and support a fiber ferrule.

5. The system of claim 4, wherein each alignment sleeve of the array of alignment sleeves includes an inner surface fabricated from, covered by or coated with zirconia ceramic or phosphor bronze.

6. The system of claim 1, wherein the base station includes a primary section and a secondary section extending from the primary section, the primary section defining an enclosure configured to at least partially receive the adapter.

7. The system of claim 6, wherein the primary section includes a base with raised blocks extending vertically on opposing sides of the base.

8. The system of claim 7, wherein the raised blocks define a narrowed section within the enclosure complementary to outer surfaces of the adapter.

9. The system of claim 6, wherein the base station includes a raised step along a base surface at a transition between the primary section and the secondary section.

10. The system of claim 9, wherein the raised step is configured to abut a front face of the adapter and an inner surface of a rear wall of the primary section is configured to abut a rear face of the adapter during assembly of the adapter with the base station.

11. The system of claim 6, wherein the secondary section includes a backshell support including a cable support section and outwardly flanged walls extending from the cable support section.

12. The system of claim 11, wherein the outwardly flanged walls define interior surfaces complementary to outer surfaces of the first backshell component.

13. The system of claim 11, wherein the outwardly flanged walls face the primary section of the base station.

14. The system of claim 6, wherein the secondary section includes raised platforms on opposing sides of a top surface, the raised platforms spaced by a gap.

15. The system of claim 14, wherein the gap is dimensioned complementary to a section of the first backshell component to ensure alignment of the first backshell component relative to the base station.

16. The system of claim 6, wherein the base station includes a cover pivotably coupled to the primary section, the cover configured to abut a front face of the adapter to maintain alignment and positioning of the adapter and the plug housing subassembly relative to the first backshell component.

17. The system of claim 16, wherein pivoting of the cover into a closed position over the adapter prevents movement of the adapter, the plug housing subassembly, and the first backshell component relative to the base station.

18. The system of claim 1, comprising a tool for manipulating a position of one or more components of the plug housing subassembly at least partially received by the adapter, the tool including a handle and a distal end with a V-shaped cutout complementary to an edge of the one or more components of the plug housing subassembly.

19. A system for fiber connector assembly, the system comprising:
an adapter configured to at least partially receive a plug housing subassembly;
a first backshell component configured to at least partially receive the plug housing subassembly;
a second backshell component configured to at least partially receive the plug housing subassembly; and
a base station configured to receive the adapter, the plug housing subassembly, and the first backshell component;
wherein the base station includes structural features designed to align and maintain a position of the adapter and the plug housing subassembly relative to the first backshell component prior to securing the second backshell component to the first backshell component;
wherein the plug housing subassembly, the first backshell component and the second backshell component define an assembled fiber connector; and
wherein the assembled fiber connector is configured to be removed from the adapter after the first backshell component and the second backshell component are coupled to the plug housing subassembly.

20. A method of fiber connector assembly, comprising:
at least partially positioning a plug housing subassembly into an adapter of a fiber connector assembly system;
positioning a first backshell component of a fiber connector onto the base station of the fiber connector assembly system;
positioning the adapter and the plug housing subassembly onto the base station;
aligning a position of the plug housing subassembly relative to the first backshell component; and
maintaining the aligned position of the plug housing subassembly relative to the first backshell component with structural features of the base station prior to securing a second backshell component to the first backshell component;
wherein the plug housing subassembly, the first backshell component and the second backshell component define an assembled fiber connector; and
wherein the assembled fiber connector is configured to be removed from the adapter after the first backshell component and the second backshell component are coupled to the plug housing subassembly.

\* \* \* \* \*